United States Patent [19]
Schmidt et al.

[11] 3,914,944
[45] Oct. 28, 1975

[54] INTERNAL COMBUSTION ENGINE, ESPECIALLY FOR AIR COMPRESSING INJECTION ENGINE
[75] Inventors: Hans-Georg Schmidt, Nurtingen-Hardt; Detlef Panten, Waiblingen, both of Germany
[73] Assignee: Daimler-Benz Aktiengesellschaft, Germany
[22] Filed: May 22, 1974
[21] Appl. No.: 472,479

[30] Foreign Application Priority Data
May 23, 1973 Germany............................ 2326206

[52] U.S. Cl. .................. 60/602; 60/605; 123/119 A
[51] Int. Cl.² ......................................... F02D 23/00
[58] Field of Search .......... 123/119 A; 60/598, 599, 60/600, 601, 602, 605, 606, 611, 614

[56] References Cited
UNITED STATES PATENTS
2,633,698  4/1953  Nettel................................. 60/599
3,149,454  9/1964  Hahn.................................. 60/601

FOREIGN PATENTS OR APPLICATIONS
941,532  11/1963  United Kingdom............. 123/119 A Primary Examiner—Charles J. Myhre
Assistant Examiner—James D. Liles
Attorney, Agent, or Firm—Craig & Antonelli

[57] ABSTRACT

An internal combustion engine, particularly an air-compressing injection internal combustion engine which includes an exhaust gas turbocharger and a by-pass line for the return of exhaust gases from the exhaust gas line to the inlet side of the engine; the by-pass line is thereby connected, on the one hand, to the exhaust gas line between the internal combustion engine and the exhaust gas turbine and, on the other, to the inlet line between the supercharger and the internal combustion engine.

8 Claims, 1 Drawing Figure

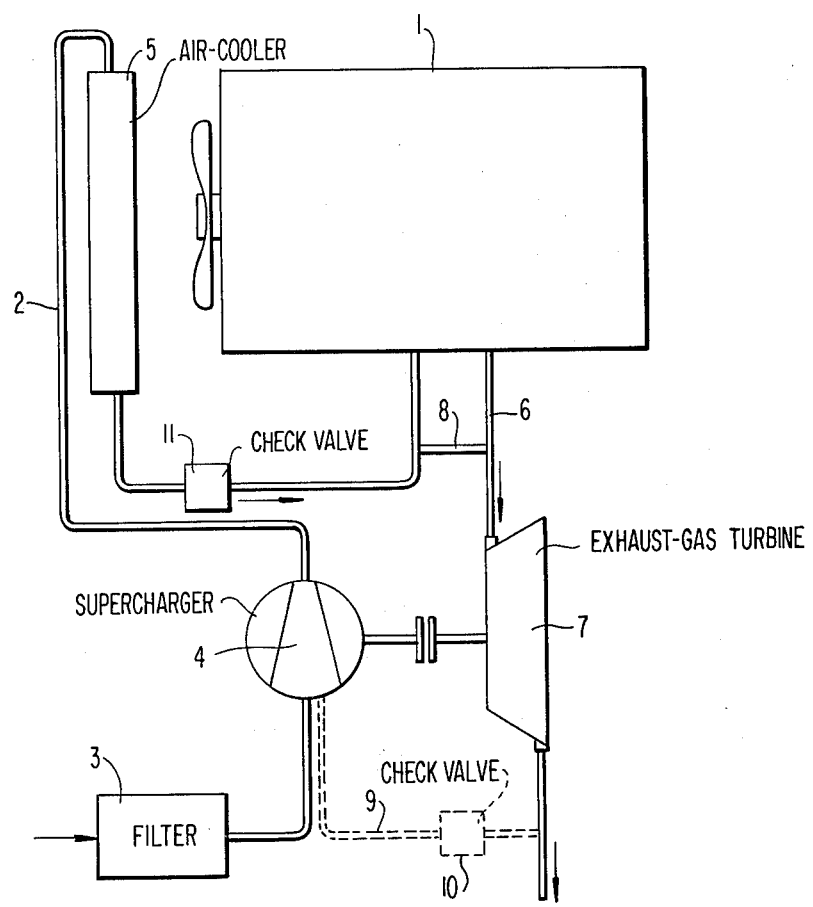

INTERNAL COMBUSTION ENGINE, ESPECIALLY FOR AIR COMPRESSING INJECTION ENGINE

The present invention relates to an internal combustion engine, especially to an air-compressing injection internal combustion engine, which is equipped with an exhaust-gas turbocharger and in which a portion of the exhaust gases are conducted back to the inlet side of the internal combustion engine.

Internal combustion engines in conjunction with an exhaust gas return may be operated poorer in harmful components, especially as regards the nitrogen oxides, than internal combustion engines without any exhaust gas return. The expenditures for the control of such an internal combustion engine, which must be incurred in order to undertake, for example, the exhaust gas admixture to the charging air as a function of various parameters of the internal combustion engine, e.g., of the rotational speed, however, is not insignificant. The present invention is therefore concerned with the task to simplify the return conduction of the exhaust gases.

The underlying problems are solved according to the present invention in that a by-pass line is provided for the return conduction of exhaust gases which, on the one hand, is connected with the exhaust gas line between the internal combustion engine and turbine and, on the other, to the inlet line between compressor or supercharger and the internal combustion engine.

A type of self-regulating effect is achieved by the present invention, dispensing with any control device, by a corresponding matching as regards the cross section of the by-pass line and of the supercharger with its effective cross sections, in that the pressures in the exhaust gas and in the compressed air are so matched to one another that at low loads, larger amounts of exhaust gases are conducted back, and more particularly up to a point at which the pressure in the compressed air is larger than the exhaust gas. Beginning with this point in the diagram, which as a rule lies at 4/5 load, no exhaust gas is conducted back anymore but instead, compressed air flows proportionately into the exhaust gas. This has as a consequence that an overloading of the internal combustion engine as a result of excessively high combustion pressures cannot occur. With air-compressing internal combustion engines, it is additionally achieved that at full load operation, no deterioration of the characteristics of the internal combustion engine due to undesired exhaust gas quantities can occur.

In case that an overflow of compressed or supercharged air into the exhaust gas through the by-pass line is not desirable, a check valve opening in the direction toward the inlet line may be arranged in the by-pass line according to a further feature of the present invention.

Insofar as under certain operating conditions of the internal combustion engine, an increase of the quantity of exhaust gases which is conducted back, is desired, an additional line may be provided which connects the exhaust gas line upstream or downstream of the turbine with the supercharger or compressor, in which a check valve may be arranged. The exhaust gas flow may be controlled in dependence on the suction pressure of the compressor or supercharger by a matched prestress of a spring keeping the check valve closed.

Accordingly, it is an object of the present invention to provide an internal combustion engine, especially an air-compressing injection-type internal combustion engine which avoids by simple means the aforementioned shortcomings and drawbacks encountered in the prior art.

Another object of the present invention resides in an internal combustion engine in which a part of the exhaust gases can be conducted back to the inlet side of the engine, yet complicated and costly control mechanisms are avoided.

A further object of the present invention resides in an internal combustion engine, especially an air-compressing injection internal combustion engine which can be operated with an exhaust gas return to the inlet side of the engine in order to reduce the harmful components present in the exhaust gases, yet complicated controls for the return are rendered unnecessary.

A still further object of the present invention resides in a simple internal combustion engine which can be operated in such a manner that, in particular, the presence of harmful nitrogen oxides in the exhaust gases is minimized.

Another object of the present invention resides in an internal combustion engine, especially in an air-compressing internal combustion engine in which no deterioration of the characteristics of the engine have to be accepted during full load operation.

Still a further object of the present invention resides in an internal combustion engine of the type described above in which an overloading of the engine due to excessive combustion pressures can be avoided.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic view of an internal combustion engine in accordance with the present invention.

Referring now to the single FIGURE of the drawing, an air-compressing injection-type internal combustion engine of conventional construction is designated in this FIGURE by reference numeral 1. Combustion air is supplied to the internal combustion engine 1 by way of an inlet line 2, in which are arranged a filter 3, a compressor or supercharger 4 and a compressed-air intercooler 5. The exhaust gases of the internal combustion engine 1 leave the same by way of an exhaust line 6 and drive an exhaust gas turbine 7, which is coupled with the supercharger 4 in the inlet line 2. A by-pass line 8 is provided for returning or conducting back the exhaust gases, which connects the exhaust gas line 6 intermediate the internal combustion engine 1 and the exhaust gas turbine 7 with the inlet line 2 intermediate the intercooler 5 and the internal combustion engine 1.

An automatic control effect is achieved with respect to the exhaust gas return after a corresponding matching of the line cross sections and of the supercharger 4 by the arrangement of the by-pass line 8, which completely renders superfluous separate control devices and assures a complete freedom of servicing needs.

Insofar as an overflow of supercharged air out of the inlet line 2 through the by-pass line 8 into the exhaust gas line 6 is to be prevented, a check valve 11 of conventional construction may be arranged in the by-pass line 8 which opens in the direction toward the inlet line 2.

Insofar as under certain operating conditions of the internal combustion engine, an increase of the returned quantity of exhaust gases is desirable, an additional line 9 connecting exhaust gas line 6 upstream or downstream of the turbine 7 with the supercharger 4—as shown in dash line—may be provided, in which again a check valve 10 of conventional construction may be arranged. The exhaust gas flow can be controlled in dependence on the suction pressure of the supercharger 4 by a matched prestress of a spring keeping the check valve 10 normally closed.

While we have shown and desribed only one embodiment in accordance with the present invention, it is understood that the same is not limited thereto but is susceptible of numerous changes and modifications as known to these skilled in the art, and we therefore do not wish to be limited to the details shown and described herein but intend to cover all such changes and modifications as are encompassed by the scope of the appended claims.

We claim:

1. An internal combustion engine with an inlet line and an exhaust gas line, the engine includes a supercharger means and an exhaust gas turbocharger means, characterized in that a by-pass line means is provided for the return of at least a portion of exhaust gases to the inlet line, one end of the by-pass line means is operatively connected with the exhaust gas line intermediate the internal combustion engine and the gas turbocharger means, the other end of the by-pass line means is operatively connected with the inlet line intermediate the supercharger means and the internal combustion engine, a check valve means is arranged in the by-pass line means which opens in the direction toward the inlet line, an additional line is provided for connecting the exhaust gas line with the supercharger means, a further check valve means is arranged in the additional line which opens in the direction toward the supercharger means, the additional line is connected with the exhaust gas line downstream of the exhaust gas turbocharger means.

2. An internal combustion engine according to claim 1, characterized in that the engine is an air-compressing injection-type internal combustion engine.

3. An internal combustion engine according to claim 1, characterized in that the cross sections of the by-pass line means and of the supercharger means are so matched to one another that an automatic control effect is achieved in that the pressures in the exhaust gas in the supercharged air are so matched to one another that at low loads larger quantities of exhaust gases are conducted back to the inlet side.

4. An internal combustion engine according to claim 1, characterized in that larger quantities of exhaust gases are conducted back through the by-pass line means up to a point at which the pressure in the supercharged air is higher than in the exhaust gases.

5. An internal combustion engine with an inlet line and an exhaust line, which includes an exhaust gas turbocharger means and which operates with return of a portion of the exhaust gases to the inlet side of the internal combustion engine, characterized in that a by-pass line means is provided for the return of exhaust gases which is operatively connected, on the one hand, with the exhaust gas line intermediate the internal combustion engine and the turbocharger means and, on the other, to the inlet line intermediate a supercharger means and internal combustion engine, the cross sections of the by-pass line means and of the supercharger means are so matched to one another that an automatic control effect is achieved in that the pressures in the exhaust gas in the supercharged air are so matched to one another that at low loads larger quantities of exhaust gases are conducted back to the inlet side, the larger quantities of exhaust gases are conducted back through the by-pass line means up to a point at which the pressure in the supercharged air is higher than in the exhaust gases, an additional line is provided connecting the exhaust gas line with the supercharger means, in which is arranged a check valve means, a spring means keeping the check valve means closed, the prestress of the spring means being matched to the suction pressure of the supercharger means in such a manner that the flow of exhaust gases through the additional line is controlled by the suction pressure of the supercharger means.

6. An internal combustion engine according to claim 5, characterized in that the additional line is connected with the exhaust gas line upstream of the turbine means.

7. An internal combustion engine according to claim 5, characterized in that the additional line is connected with the exhaust gas line downstream of the turbine means.

8. An internal combustion engine with an inlet line and an exhaust line, which includes an exhaust gas turbocharger means and which operates with return of a portion of the exhaust gases to the inlet side of the internal combustion engine, characterized in that a by-pass line means is provided for the return of exhaust gases which is operatively connected, on the one hand, with the exhaust gas line intermediate the internal combustion engine and the turbocharger means and, on the other, to the inlet line intermediate a supercharger means and internal combustion engine, an additional line is provided for connecting the exhaust gas line with the supercharger means, in which is arranged a check valve means, a spring means keeping the check valve means closed, the prestress of the spring means being matched to the suction pressure of the supercharger means in such a manner that the flow of exhaust gases through the additional line is controlled by the suction pressure of the supercharger means.

* * * * *